United States Patent
Al-Qasim et al.

(10) Patent No.: US 11,905,464 B2
(45) Date of Patent: Feb. 20, 2024

(54) COVALENT ORGANIC FRAMEWORKS FOR IMPROVED OIL RECOVERY

(71) Applicant: SAUDI ARABIAN OIL COMPANY, Dhahran (SA)

(72) Inventors: Abdulaziz S. Al-Qasim, Dammam (SA); Yuguo Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/213,440

(22) Filed: Mar. 26, 2021

(65) Prior Publication Data

US 2022/0306931 A1    Sep. 29, 2022

(51) Int. Cl.
| | | |
|---|---|---|
| E21B 43/34 | (2006.01) | |
| C09K 8/92 | (2006.01) | |
| B01J 13/02 | (2006.01) | |
| C09K 8/594 | (2006.01) | |

(52) U.S. Cl.
CPC .............. C09K 8/92 (2013.01); B01J 13/025 (2013.01); C09K 8/594 (2013.01)

(58) Field of Classification Search
CPC ............ C09K 8/92; C09K 8/594; E21B 43/34
USPC ........................................................ 166/403
See application file for complete search history.

(56) References Cited

U.S. PATENT DOCUMENTS

| | | | |
|---|---|---|---|
| 7,373,977 B1 | 5/2008 | Berger et al. | |
| 9,604,194 B2 * | 3/2017 | Wang ................. | B01J 20/28045 |
| 10,214,680 B2 | 2/2019 | Barati Ghahfarokhi | |
| 10,934,475 B2 | 3/2021 | Ren et al. | |
| 11,279,621 B1 | 3/2022 | Liu et al. | |
| 2006/0046947 A1 | 3/2006 | Chen | |
| 2009/0054272 A1 | 2/2009 | Prud'Homme et al. | |
| 2010/0243248 A1 | 9/2010 | Golomb et al. | |
| 2012/0015852 A1 | 1/2012 | Quintero et al. | |
| 2012/0322694 A1 | 12/2012 | Monteiro et al. | |

(Continued)

FOREIGN PATENT DOCUMENTS

| | | |
|---|---|---|
| CA | 3008942 A1 | 6/2017 |
| EP | 2902361 A1 | 8/2015 |

(Continued)

OTHER PUBLICATIONS

Liu et al.; "A hydrophilic covalent organic framework for photocatalytic oxidation of benzylamine in water"; Chemical Communications; Issue 5; Dec. 10, 2019 (5 pages).

(Continued)

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

A dispersion of capsules in critical or supercritical carbon dioxide is provided. The capsules include an aqueous solution encapsulated by covalent organic framework particles. Also provided is a method of making a dispersion of aqueous solution capsules. The method includes providing a medium of critical or supercritical carbon dioxide, introducing the aqueous solution into the critical or supercritical carbon dioxide medium, and introducing a covalent organic framework particle into the critical or supercritical carbon dioxide medium. Associated methods of using the disclosed dispersions in hydrocarbon-bearing formations are also provided.

17 Claims, 8 Drawing Sheets

(56) References Cited

U.S. PATENT DOCUMENTS

| | | | |
|---|---|---|---|
| 2013/0109879 | A1 | 5/2013 | Berger et al. |
| 2013/0200299 | A1 | 8/2013 | Mazyar et al. |
| 2014/0011034 | A1 | 1/2014 | Majumder et al. |
| 2014/0077138 | A1 | 3/2014 | Taha-Tijerina et al. |
| 2014/0096964 | A1 | 4/2014 | Chakraborty et al. |
| 2014/0131046 | A1* | 5/2014 | Al-Otaibi ............. B01J 13/20 |
| | | | 166/305.1 |
| 2016/0024374 | A1* | 1/2016 | Sadana ............. E21B 43/164 |
| | | | 166/272.6 |
| 2017/0198201 | A1* | 7/2017 | Chang ................. C09K 8/588 |
| 2017/0225146 | A1 | 8/2017 | Wang et al. |
| 2017/0225147 | A1 | 8/2017 | Wang et al. |
| 2018/0320056 | A1* | 11/2018 | Mazyar ................. C09K 8/58 |
| 2018/0327658 | A1 | 11/2018 | Al-Harbi et al. |
| 2019/0345374 | A1 | 11/2019 | Al-Otaibi et al. |
| 2020/0290879 | A1 | 9/2020 | Chang et al. |
| 2020/0308080 | A1 | 10/2020 | Gamot et al. |

FOREIGN PATENT DOCUMENTS

| | | |
|---|---|---|
| WO | 201664611 A1 | 4/2016 |
| WO | 2016115142 A1 | 7/2016 |
| WO | 2016205289 A1 | 12/2016 |
| WO | 2019140340 A1 | 7/2019 |

OTHER PUBLICATIONS

Hou et al.; "Covalent Organic Framework-Functionalized Magnetic CuFe2O4/Ag Nanoparticles for the Reduction of 4-Nitrophenol"; Nanomaterials; vol. 10; Issue 3; Mar. 2020; pp. 1-13 (13 pages).

Li et al.; "Core-Shell Structured Magnetic Covalent Organic Framework Nanocomposites for Triclosan and Triclosan Adsorption"; ACS Applied Materials & Interfaces; vol. 11; Jun. 10, 2019; pp. 22492-22500 (9 pages).

Cai et al.; "Magnetic solid phase extraction and gas chromatography-mass spectrometrical analysis of sixteen polycyclic aromatic hydrocarbons"; Journal of Chromatography A; vol. 1406; Jun. 20, 2015; pp. 40-47 (8 pages).

Kyakuno et al.; "Amorphous water in three-dimensional confinement of zeolite-templated carbon"; Chemical Physics Letters; vol. 571; Apr. 17, 2013; pp. 54-60 (7 pages).

Jiao et al.; "Water under the Cover: Structures and Thermodynamics of Water Encapsulated by Graphene"; Scientific Reports; vol. 7; Sep. 2015; pp. 1-19 (19 pages).

Samara et al.; "Unconventional oil recovery from Al Sultani tight rock formations using supercritical CO2"; The Journal of Supercritical Fluids; vol. 152; Oct. 2019; pp. 1-9 (9 pages).

Han et al.; "Superhydrophobic Covalent Organic Frameworks Prepared via Pore-Surface Modifications for Functional Coatings under Harsh Conditions"; ACS Applied Materials & Interfaces; vol. 12; Nov. 21, 2019; pp. 2926-2934 (40 pages).

Xu et al.; "Organic-Inorganic Composite Nanocoatings with Superhydrophobicity, Good Transparency, and Thermal Stability"; vol. 4; No. 4; Mar. 19, 2010; pp. 2201-2209 (9 pages).

Furukawa, H. and Yaghi, O. M.; "Storage of Hydrogen, Methane, and Carbon Dioxide in Highly Porous Covalent Organic Frameworks for Clean Energy Applications"; Journal of the American Chemical Society; vol. 131; Jun. 4, 2009; pp. 8875-8883 (9 pages).

Geng et al.; "Covalent Organic Frameworks: Design, Synthesis, and Functions"; Chemical Reviews; vol. 120; Issue 16; Jan. 22, 2020; pp. CW-DP (20 pages).

Prakesh et al.; "Spontaneous recovery of superhydrophobicity on nanotextured surfaces"; Proceedings of the National Academy of Sciences; vol. 113; No. 20; May 2, 2016; pp. 1-6 (6 pages).

Tie et al.; "Organic Media Superwettability: On-Demand Liquid Separation by Controlling Surface Chemistry"; ASC Applied Materials & Interfaces; vol. 10; No. 43; Oct. 8, 2018 (27 pages).

Liu et al.; "Developments of 'Liquid-like' Copolymer Nanocoatings for Reactive Oil-Repellent Surface"; ACS Nano; vol. 11; No. 2; Feb. 23, 2017; pp. 2248-2256 (9 pages).

Anderson et al.; "First-Principles Prediction of Liquid/Liquid Interfacial Tension", Journal of Chemical Theory and Computation, vol. 10, Issue 8, May 28, 2014, pp. 3401-3408 (8 pages).

Voronina et al., "Physical foaming of fluorinated ethylene-propylene (FEP) copolymers in supercritical carbon dioxide: single-film fluropolymer piezoelectrets", Applied Physics A—Materials Science & Processing, vol. 90, Issue 4, Mar. 2008, pp. 615-618 (4 pages).

Zhang, Y et al., "Dissolution of surfactants in supercritical CO2 with co-solvents", Chemical Engineering Research and Design, vol. 94, Feb. 2015, pp. 624-631 (8 pages).

Rudyk et al., "Supercritical carbon dioxide extraction of oil sand enhanced by water and alcohols as Co-solvents", Journal of CO2 Utilization, vol. 17, Jan. 2017, pp. 90-98 (9 pages).

Jaime Wisniak and Jacob Zabicky, "The Chemistry of Jojoba Oil", Proceedings of the Sixth International Conference on Jojoba and Its Uses, 1985, pp. 311-322 (7 pages).

"Graphene properties (A Complete Reference)", Jul. 15, 2021; Retrieved from the Internet: URL: http://www.graphene-battery.net/graphene-properties.htm (2 pages).

Li et al., "Field and Temperature dependence of intrinsic diamagnetism in graphene: Theory and experiment", Physical Review B, vol. 91, Issue 9, Mar. 1, 2015 (5 pages).

Shinn et al., "Nuclear Energy Conversion with Stacks of Graphene Nanocapacitors", Complexity, vol. 18, Issue 3, Oct. 22, 2012, pp. 24-27 (4 pages).

A.K. Geim and K.S. Novoselov, "The Rise of Graphene", Nature Materials, vol. 6, Apr. 2007, pp. 1-14 (14 pages).

Kawaguchi et al., "Electronic structure and intercalation chemistry of graphite-like layered material with a composition of BC6N", Journal of Physics and Chemistry of Solids, vol. 69, Issues 5-6, May 2008, pp. 1171-1178 (8 pages).

Lee et al., "A route towards superhydrophobic graphene surfaces: surface-treated reduced graphene oxide spheres", Journals of Materials Chemistry A, vol. 1, Issue 25, 2013, pp. 7312-7315 (4 pages).

Zhang et al., "Biomimetic graphene films and their properties", Nanoscale, vol. 4, Issue 16, Jun. 6, 2012, pp. 4858-4869 (12 pages).

Wang et al., "Biomimetic Graphene Surfaces with Superhydrophobicity and Iridescence", Chemistry An Asian Journal, vol. 7, Issue 2, Feb. 6, 2012, pp. 301-304 (4 pages).

Zhang et al., "Super-hydrophobic graphene coated polyurethane (GN@PU) sponge with great oil-water separation perfomance", Applied Surface Science, vol. 422, Nov. 2017, pp. 116-124 (9 pages).

Zengguo Bai and Bin Zhang, "Fabrication of superhydrophobic reduced-graphene oxide/nickel coating with mechanical durability, self-cleaning and anticorrosion performance", Nano Materials Science, vol. 2, Issue 2, Jun. 2020, pp. 151-158 (8 pages).

Wang et al., "Recent developments in superhydrophobic graphene and graphene-related materials: from preparation to potential applications", Nanoscale, Issue 16, Mar. 12, 2015 (15 pages).

Kumari et al., "Corrosion-Resistant Hydrophobic Nanostructured Ni-Reduced Graphene Oxide Composite Coating with Improved Mechanical Properties", Journal of Materials Engineering and Performance, vol. 27, Issue 18, Oct. 23, 2018, pp. 5889-5898 (9 pages).

Zhang et al., "One-step fabrication of robust superhydrophobic and superoleophilic surfaces with self-cleaning and oil/water separation function", Scientific Reports, vol. 8, Mar. 2018, pp. 1-12 (12 pages).

Boinovich et al., "Origins of Thermodynamically Stable Superhydrophobicity of Boron Nitride Nanotubes Coatings", Langmuir, vol. 28, No. 2, Jan. 17, 2012, pp. 1206-1216 (11 pages).

Aliev et al., "Superhydrophobic Coatings Based on Boron Nitride Nanotubes: The Mechanism of Superhydrophobicity and Self-Regeneration of Highly Hydrophobic Properties", Nanotechnologies in Russia, vol. 6, Nos. 11-12, Dec. 23, 2011, pp. 723-732 (10 pages).

Lee et al., "Superhydrophobicity of Boron Nitride Nanotubes Grown on Silicon Substrates", Langmuir, vol. 25, No. 9, Apr. 8, 2009, pp. 4853-4860 (8 pages).

Zhou et al., "Superhydrophobic hBN-Regulated Sponges with Excellent Absorbency Fabricated Using a Green and Facile Method", Scientific Reports, vol. 7, Mar. 23, 2017, pp. 1-10 (10 pages).

(56) References Cited

OTHER PUBLICATIONS

Diao et al., "Oil adsorption performance of graphene aerogels", Journal of Materials Science, vol. 55, Dec. 16, 2019, pp. 4578-4591 (14 pages).
Petridis et al., "Advanced Low-Cost Separation Techniques in Interface Science", Elsevier, Ch. 8, vol. 30, 2019, pp. 173-197 (25 pages).
Ning et al.; "High capacity oil adsorption by graphene capsules"; Nanoscale; Issue 34; Jul. 27, 2017 (5 pages).
Chen et al.; "Graphene Sponge as an Efficient and Recyclable Oil Sorbent"; AIP Conference Proceedings; vol. 1877; Issue 1; Sep. 11, 2017; pp. 030005-1-030005-10 (10 pages).
Marchesini et al.; "Porous Boron Nitride Materials: Influence of Structure, Chemistry and Stability on the Adsorption of Organics", Frontiers in Chemistry; vol. 7; Mar. 2019; pp. 1-9 (9 pages).
Li et al.; "Tuning the Chemical Hardness of Boron Nitride Nanosheets by Doping Carbon for Enhanced Adsorption Capacity", ACS Omega; vol. 2; Issue 9; Sep. 1, 2017; pp. 5385-5394 (10 pages).
J. Luo et al.; "Activated boron nitride ultrathin nanosheets for enhanced adsorption desulfurization performance"; Journal of the Taiwan Institute of Chemical Engineers; vol. 93; Dec. 2018; pp. 245-252 (8 pages).
A. K. Mishra and S. Ramaprabhu; "Carbon dioxide adsorption in graphene sheets"; AIP Advances; vol. 1; Issue 3; Sep. 1, 2011; pp. 032152-1-032152-6 (6 pages).
D. Iruretagoyena et al.; "Adsorption of carbon dioxide on graphene oxide supported layered double oxides", Adsorption; vol. 20; Dec. 5, 2013; pp. 321-330 (10 pages).
W Othman et al.; "Adsorption of $CO_2$ on Fe-doped graphene nano-ribbons: Investigation of transport properties"; Journal of Physics: Conference Series; vol. 869; Jul. 2017 (4 pages).
Xu et al.; "The $CO_2$ Storage Capacity of the Intercalated Diaminoalkane Graphene Oxides: A Combination of Experimental and Simulation Studies"; Nanoscale Research Letters; vol. 10; Aug. 8, 2015; pp. 1-10 (10 pages).
Sun et al.; "Charge-Controlled Switchable $CO_2$ Capture on Boron Nitride Nanomaterials", Journal of the American Chemical Society; vol. 135; Issue 22; May 2013 (9 pages).
Li, J et al.; "Activated boron nitride as an effective adsorbent for metal ions and organic pollutants"; Scientific Reports; vol. 3; Nov. 13, 2013; pp. 1-7 (7 pages).
Mao, X et al.; "Metal-free graphene/boron nitride heterointerface for $CO_2$ reduction: Surface curvature controls catalytic activity and selectivity"; vol. 2; Issue 1; Jan. 19, 2020; pp. 1-8 (8 pages).
Chen, S et al.; "Carbon Doping of Hexagonal Boron Nitride Porous Materials toward $CO_2$ Capture"; Journal of Materials Chemistry A; Issue 4; 2018; pp. 1-9 (9 pages).
Coleman, J. N. et al.; "Two-Dimensional Nanosheets Produced by Liquid Exfoliation of Layered Materials"; Science; vol. 331; Issue 6017; Feb. 4, 2011; pp. 568-571 (4 pages).
A. Ambrosi and M. Pumera, "Electrochemically Exfoliated Graphene and Graphene Oxide for Energy Storage and Electrochemistry Applications"; Chemistry A European Journal; vol. 22; Issue 1; Jan. 4, 2016; pp. 153-159 (7 pages).
Chen, Z. et al.; "Activated carbons and amine-modified materials for carbon dioxide capture—a review"; Frontiers of Enviromental Science & Engineering; vol. 7; Jun. 2013; pp. 326-340 (15 pages).
Chen, B. et al.; "Atomically homogeneous dispersed ZnO/N-doped nanoporous carbon composites with enhanced $CO_2$ uptake capacities and high efficient organic pollutants removal from water"; Carbon; vol. 95; Aug. 8, 2015; pp. 113-124 (12 pages).
Al Otaibi, M. S.; "Post-Synthesis Functionalization of Porous Organic Polymers for $CO_2$ Capture"; KAUST Research Repository; Jul. 2014; pp. 1-70 (70 pages).
Dawson, R. et al.; "Nanoporous organic polymer networks"; Progress in Polymer Science; vol. 37; Issue 4; Apr. 2012; pp. 530-563 (34 pages).
Maly, K. E.; "Assembly of nanoporous organic materials from molecular building blocks"; Journal of Materials Chemistry; vol. 19; Issue 13; Jan. 14, 2009; pp. 1781-1787 (7 pages).
Jiang, J. and Cooper, A. I.; "Microporous Organic Polymers: Design, Synthesis, and Function"; Topics in Current Chemistry; vol. 293; Sep. 1, 2009; pp. 1-33 (33 pages).
Côté, A. P. et al.; "Porous, Crystalline, Covalent Organic Frameworks"; Science; vol. 310; Nov. 18, 2005; pp. 1166-1170 (5 pages).
El-Kaderi, H. M. et al.; "Designed Synthesis of 3D Covalent Organic Frameworks"; Science; vol. 316; Apr. 13, 2007; pp. 268-272 (5 pages).
Uribe-Romo, F. J. et al.; "A Crystalline Imine-Linked 3-D Porous Covalent Organic Framework"; Journal of the American Chemical Society; vol. 131; pp. 4570-4571 (2 pages).
Duncan J. Shaw; "Introduction to Colloid and Surface Chemistry"; Butterworth-Heinemann; Ch. 10; Feb. 24, 1992; pp. 262-276 (15 pages).
Sun et al.; "Integrating Superwettability within Covalent Organic Frameworks for Functional Coating"; Chem; vol. 4; Jul. 12, 2018; pp. 1-14 (14 pages).
Final Office Action Issued in Corresponding U.S. Appl. No. 17/213,411, dated Aug. 1, 2022, 22 pages.
Non-Final Office Action issued in corresponding U.S. Appl. No. 17/213,411, dated Apr. 22, 2022 (29 pages).
Office Action dated Mar. 2, 2023 in corresponding U.S. Appl. No. 17/213,411, 15 pages.
Office Action issued in the corresponding U.S. Appl. No. 17/213,411, dated Jun. 15, 2023 (12 pages).
Final Office Action issued in corresponding U.S. Appl. No. 17/213,449, dated Nov. 3, 2022, 21 pages.

\* cited by examiner

COVALENT ORGANIC FRAMEWORKS FOR IMPROVED OIL RECOVERY

BACKGROUND

During primary oil recovery, oil inside an underground hydrocarbon reservoir is driven to the surface by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from hydrocarbon-bearing formations. Some examples of these techniques include water flooding, chemical flooding, and supercritical $CO_2$ injections.

Supercritical $CO_2$ is an useful fluid for enhanced oil recovery applications due to its chemical and physical properties. Supercritical $CO_2$ is miscible with hydrocarbons. Thus, when it contacts hydrocarbon fluid in a reservoir, the fluid is displaced from the rock surfaces and pushed toward the production well. Additionally, $CO_2$ may dissolve in the hydrocarbon fluid, reducing its viscosity and causing it to swell. This further enhances the ability to recover hydrocarbons and increase production. As well, injecting $CO_2$ into a subterranean area is a means of sequestering a greenhouse gas.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to an aqueous solution encapsulated by covalent organic framework particles.

In another aspect, embodiments disclosed relate to a dispersion of capsules in critical or supercritical carbon dioxide, the capsules comprising an aqueous solution encapsulated by covalent organic framework particles.

In another aspect, embodiments disclosed relate to a dispersion of capsules in critical or supercritical carbon dioxide, the capsules comprising an aqueous solution encapsulated by hydrophobic covalent organic framework particles. The capsules are further encapsulated by supercritical carbon dioxide, which is encapsulated by hydrophilic covalent organic framework particles. The capsules are further encapsulated by water and dispersed in the critical or supercritical carbon dioxide.

In yet another aspect, embodiments disclosed relate to a method of making a dispersion of aqueous solution capsules. The method includes providing a medium of critical or supercritical carbon dioxide, introducing the aqueous solution into the critical or supercritical carbon dioxide medium, and introducing a covalent organic framework particle into the critical or supercritical carbon dioxide medium.

In another aspect, embodiments disclosed relate to a method of making a dispersion of aqueous solution capsules. The method includes providing a medium of critical or supercritical carbon dioxide, introducing the aqueous solution into the critical or supercritical carbon dioxide medium, introducing a hydrophobic covalent organic framework particle into the critical or supercritical carbon dioxide medium, introducing water into the critical or supercritical carbon dioxide medium, and introducing a hydrophilic covalent organic framework particle into the critical or supercritical carbon dioxide medium.

In another aspect, embodiments disclosed relate to a method of treating a hydrocarbon-bearing formation. The method includes introducing into a hydrocarbon-bearing formation a dispersion of aqueous solution capsules in a medium of critical or supercritical carbon dioxide. The aqueous solution capsules include an aqueous solution encapsulated by covalent organic framework particles.

Other aspects and advantages of the claimed subject matter will be apparent from the following description and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

DETAILED DESCRIPTION

Carbon dioxide ($CO_2$) is widely used in flooding processes for enhanced oil recovery. While it can be effective for oil recovery due to its affinity for hydrocarbons and its ability to be used in its supercritical state in hydrocarbon-bearing formations, it suffers from a number of challenges in its use. The density of $CO_2$ is less than many of the fluids present in subterranean formations, including water and the liquid and semi-solid hydrocarbons. Due to this reduced density, $CO_2$ has a tendency to seek upward-directed flow paths in the reservoir as it progresses away from the injection point and through the reservoir. This phenomenon is called "gravity override." This may lead to the introduced $CO_2$ preferentially bypassing portions of the reservoir and leaving oil untreated.

The present disclosure relates to a composition and a method for increasing the density of carbon dioxide ($CO_2$) in the critical or supercritical state (in total "SCCO2") by adding an aqueous solution encapsulated by a covalent organic framework (COF) particle to the SCCO2 medium. The SCCO2-based dispersion described provides a $CO_2$ composition in the critical or supercritical state with a greater density than critical or supercritical $CO_2$ without the dispersant. The SCCO2-based dispersion does not suffer from the gravity override effect. Such compositions lead to improved sweep efficiency and enhanced oil recovery of the hydrocarbon-bearing formation.

Capsule of Aqueous Solution

Figure 1:
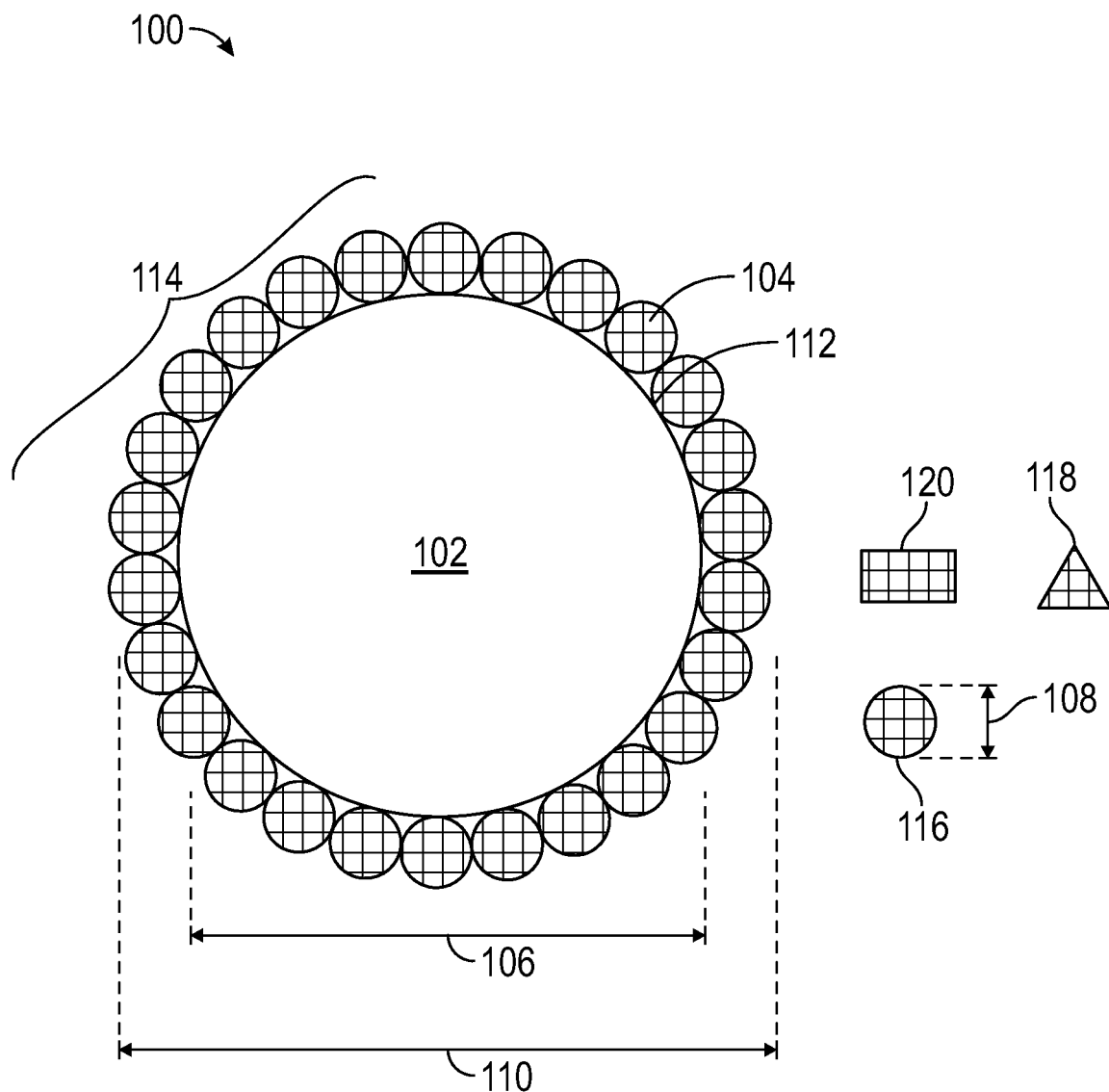
FIG. 1 is a simplified schematic of a capsule in accordance with one or more embodiments of the present disclosure.

In one aspect, embodiment capsule disclosed relates to an aqueous solution encapsulated by COF (covalent organic framework) particles. FIG. 1 shows a simplified schematic of an embodiment capsule useful for treating subterranean formations. FIG. 1 shows a capsule 100 having an aqueous solution 102 that is encapsulated by hydrophobic COF particles 104. The aqueous solution 102 as given in capsule 100 has a solution diameter 106. The COF particles 104 have a COF particle diameter 108. The capsule 100 has a capsule diameter 110. In the embodiment shown in FIG. 1, the surface 112 of the aqueous solution 102 is surrounded by a layer of COF particles 104 that forms an encapsulating shell 114 around the aqueous solution 102 such that the aqueous solution 102 is encapsulated. Several potential 3-dimensional (3D) shape configuration of the COF particles 104 are represented, such as spherical 116, pyramidal 118, and cubic 120.

Embodiment capsule includes an aqueous solution. For one or more embodiments of the capsule, the aqueous solution includes water. The water may comprise one or more known compositions of water, including distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; and combinations thereof.

In some embodiments, the aqueous solution is in the form of a liquid, for example, a droplet or sphere, within the embodiment capsule. In such embodiments, the solution diameter may have a range of from about 10 nm (nanometers) to about 100 µm (micrometers), meaning the capsules have a $D_1$ of about 10 nm and a $D_{99}$ of about 100 µm. In some embodiments, the solution diameter may have a range of from about 10 nm to 200 nm. In other embodiments, the solution diameter may have a range of from about 10 µm to 100 µm. A $D_1$ value means that 1% of the diameters have a diameter of less than the $D_1$ value. A $D_{99}$ value means that 99% of the solution diameters have a diameter of less than the $D_{99}$ value.

The embodiment capsule also includes a covalent organic framework (COF) particle. In some such embodiments, the covalent organic framework particle comprises a covalent organic framework (COF). The covalent organic frameworks are crystalline porous polymers. The polymer backbone of the COFs is not particularly limited, and may composed of light elements such as boron, carbon, nitrogen, oxygen, silicon and combinations thereof. In some embodiments, the COF backbone may include at least one hydrophobic aromatic structure, such as a benzene ring.

Figure 2:
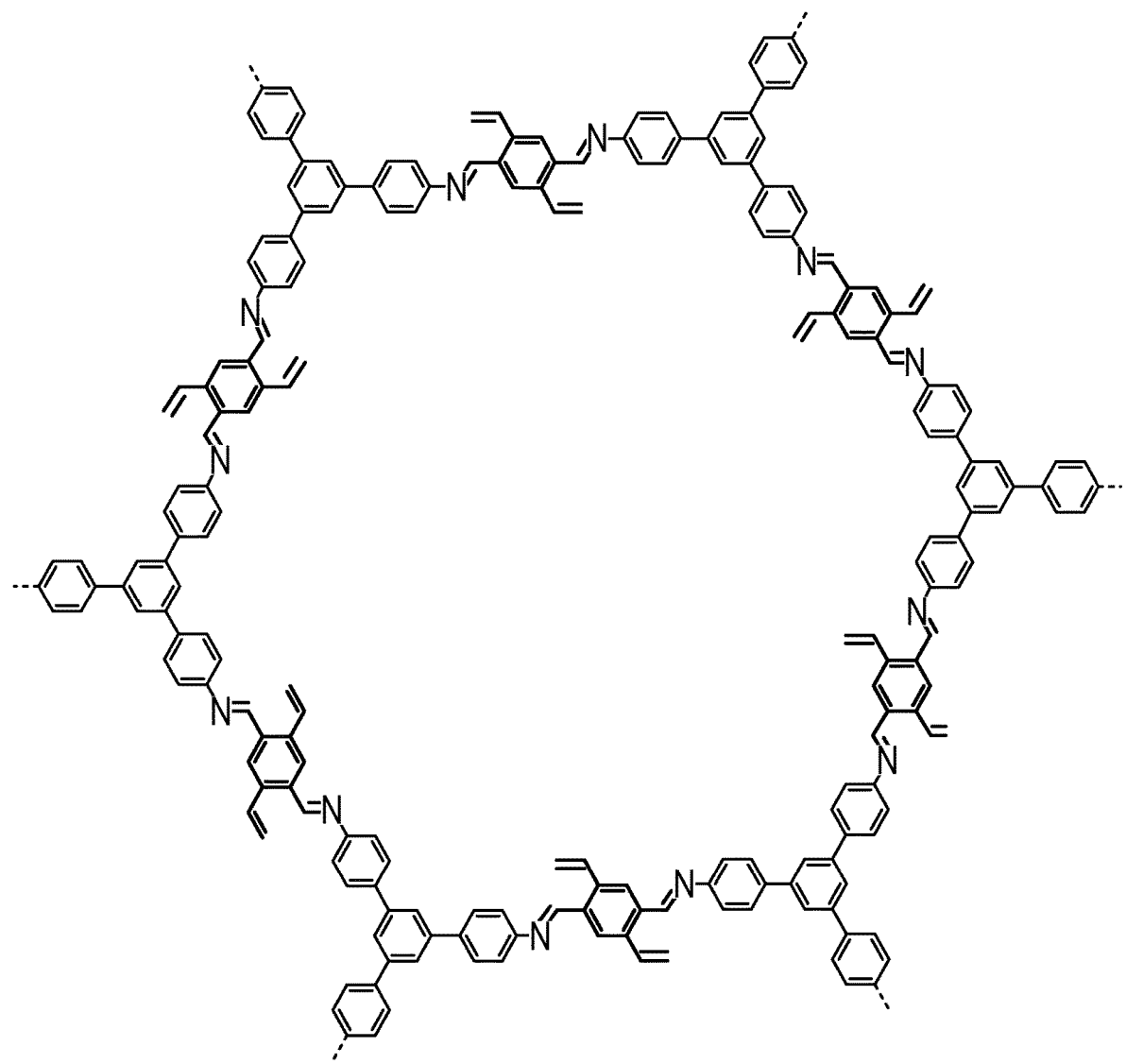
FIG. 2 is a covalent organic framework backbone structure in accordance with one or more embodiments of the present disclosure.
Figure 3:
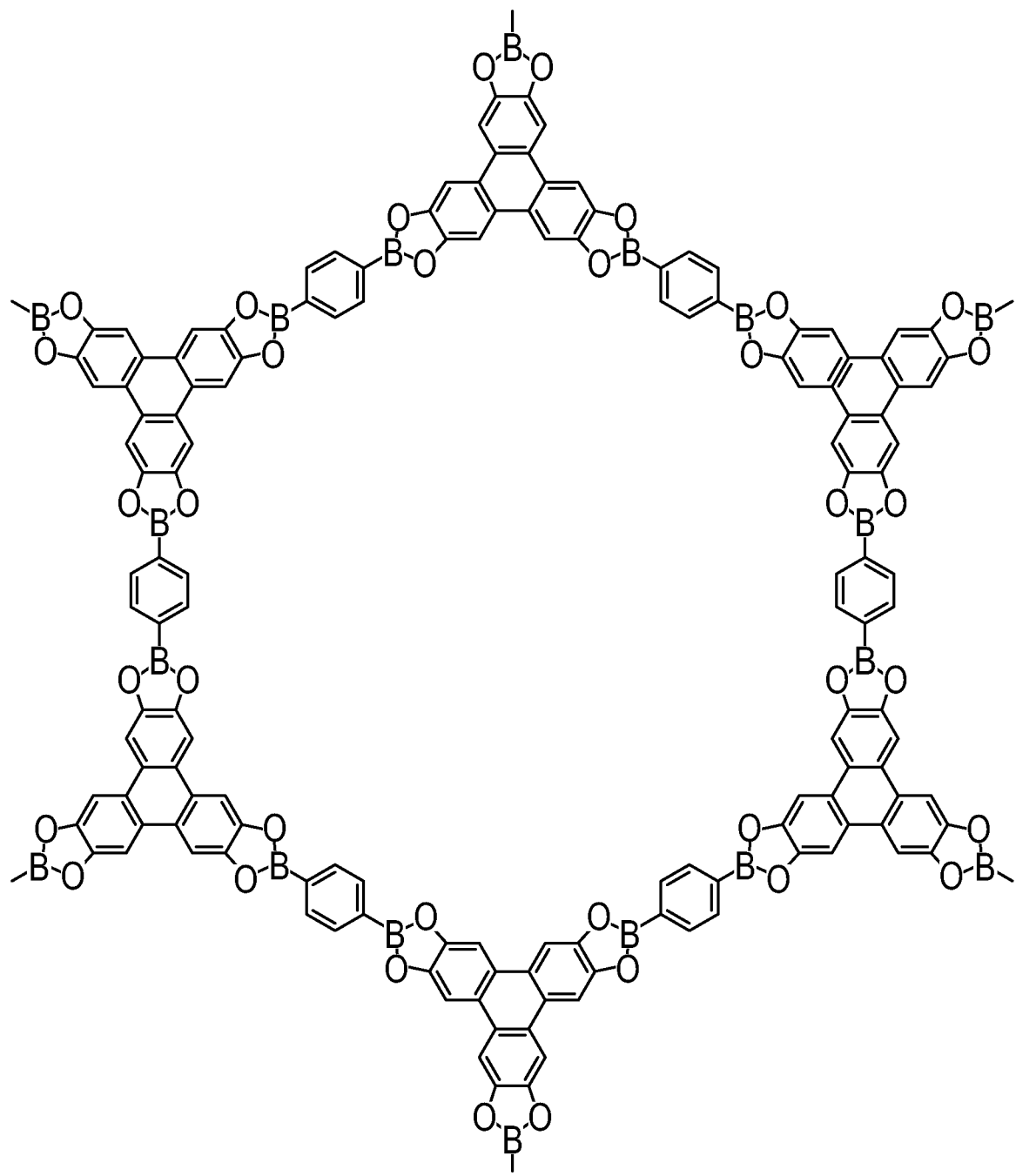
FIG. 3 is a covalent organic framework backbone structure in accordance with one or more embodiments of the present disclosure.

In certain embodiments, the disclosed COFs may have a backbone structure as shown in FIG. 2 or FIG. 3.

The covalent organic framework may be composed of monomers that have been polymerized to form repeating units to make up the covalent organic framework. As such, the structure of the COFs may be determined by the chemical structure of the monomers used and the extent of polymerization thereof. Exemplary monomers include but are not limited to 1,3,5-tris(4-aminophenyl)-benzene (formula 3); 2,5-divylterephthaladehyde (formula 4); phenyl diboronic acid (formula 5); and hexahydroxytriphenylene (formula 6), as shown in structures 3-6, respectively.

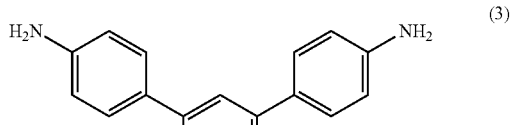

(3)

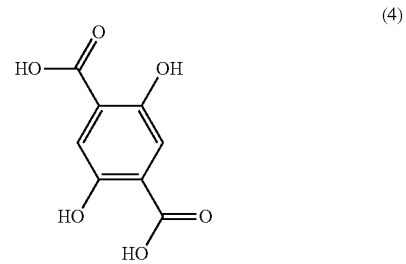

(4)

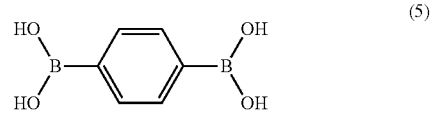

(5)

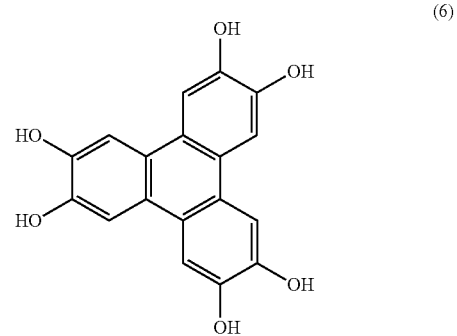

(6)

Useful monomers may include two, three, or four linking groups that participate in polymerization reactions to form COFs. Useful linking groups may include, but are not limited to, amines, hydroxyl groups, and aldehydes. Polymerization reactions to form the COF structures may include, for example, condensation reactions of the previously described monomers.

In one or more embodiments of the capsule, the COFs may be configured as a 2-dimensional (2D) particle. As used in this disclosure, a 2D particle is a sheet of material that is effectively 2-dimensional, meaning the thickness of the particle is negligibly small compared to the other dimensions of the particle, such as length or diameter. For example, such sheets may only be several atomic layers thick, whereas the other dimensions may be measured in nanometers or micrometers. In some embodiments, the 2D COF particles may be composed of sheets of $sp^2$ hybridized atoms, such as carbon. In some embodiments, the 2D COFs may be made by polymerizing generally planar monomers into sheets.

In some embodiments of the capsule, the COFs may be configured as a 3-dimensional (3D) particle, meaning the COF is composed of a 3D network of atoms to form a crystalline polymer.

Useful COFs for the embodiment capsule may either be hydrophobic or hydrophilic. In the embodiment shown in FIG. 1, the COFs are hydrophobic COFs encapsulating the aqueous solution. Useful COFs may have any suitable degree of hydrophobicity or hydrophilicity. The degree of hydrophobicity or hydrophilicity may be tuned based upon the chemical makeup on the COF as synthesized, by adding desired functionality to the COF particles, or both.

In some embodiments, the COF particles are hydrophobic. In such embodiments, the water contact angle of embodiment COF particles is from about 90° to about 180°. In some embodiments, the water contact angle of embodiment COF particles is at least 120°, such as at least 150°.

In some embodiments, the COF particles are hydrophilic. In such embodiments, the water contact angle of embodiment COF particles is less than 90°.

In some embodiments of the capsule, the COF particles comprise COFs that are functionalized. As described here, functionalization means chemically modifying a surface of a COF to include a certain chemical functionality. In some embodiments, the COFs are fluorinated, brominated or chlorinated. Imparting such chemical functionality may increase the hydrophobicity of the COF particles. In some embodiments, COF particles may be functionalized to increase the hydrophilicity of the COFs.

Embodiment COF particles may have an appropriate BET surface area for use in supercritical $CO_2$ environments. As used here, "BET surface area" refers to the average surface area of the COF particles as measured by the BET (Brunauer Emmet Teller) nitrogen absorption method according to ASTM D-6556. BET surface area is reported in meters squared per gram of material. As will be explained in greater detail, in embodiment dispersions, supercritical $CO_2$ adsorbs on the surface of hydrophobic COFs. Without wishing to be bound by any particular mechanism or theory, it is believed that by tuning the surface area of embodiment COFs, the amount of $CO_2$ adsorption to the surface of the COFs may be tuned. That is, it is believed that increasing particle surface area will result in greater amounts of $CO_2$ being absorbed by the COF particle, and vice versa. In turn, greater amounts of $CO_2$ concentrated in a smaller volume results in a further densification of the bulk SCCO2 medium.

In some embodiments, the BET surface area of the COFs may be from about 700 to about 3700 $m^2/g$ (meters squared per gram). In some embodiments, the BET surface area of embodiment COFs may have a lower limit of one of 700, 725, 750, 800, 900, 1000, 1200, 1400, 1700, 1750, 1775, and 1800 $m^2/g$, and an upper limit of one of 2000, 2250, 2500, 2750, 3000, 3250, 3500, and 3700 $m^2/g$, where any lower limit may be paired with any mathematically compatible upper limit.

On the macro-scale, COF particles may be any appropriate shape useful for encapsulating aqueous solutions. As previously shown in FIG. 1, COF particles maybe spherical 116, cubic 120, and pyramidal 118; however, geometric and non-geometric configurations are not limited except as to provide for an encapsulating surface for the aqueous solution. Similarly, 2-dimensional COF particles may be any appropriate shape, and in certain embodiments may be circular, square or triangular. In some embodiments of the capsule, the shapes may be 2D or 3D, or both. For example, 2D COFs may be in the form of sheets, and such sheets may roll into 3D cylinders.

The COF particles may be any appropriate size for encapsulating aqueous solutions. Based upon the configuration or geometry of the form of the COF particle, the particle size may be determined by a center-traversing axis parallel providing the longest length. So, for example, a sphere may be measured by its diameter; a cube by its diagonal. In some embodiments, the COF particles have a particle size in a range of from about 50 to about 250 nm (nanometers) meaning the COFs have a $D_1$ of about 50 nm and a $D_{99}$ of about 250 nm. A $D_1$ value means that 1% of the COF particles have a diameter of less than the $D_1$ value. A $D_{99}$ value means that 99% of the particles have a diameter of less than the $D_{99}$ value.

As described, the embodiment capsule includes an aqueous solution that is encapsulated by COF particles. The aqueous solution is surrounded by the COF particles and does not disperse into the medium hosting the capsules. In one or more embodiments of the capsule, the aqueous solution and the COF particles are as previously described.

In some embodiments of the capsule, the capsules have a capsule size that is in a range of from about a few nanometers to a few millimeters. The capsule size is effectively the diameter of the particle diameter. The capsule size for a given embodiment capsule should be approximately the same in all directions of the roughly spherical shape; however, variations in configuration between a given COF particle and another may provide some statistically insignificant differences in determined capsule size range based on one diameter versus another. In such embodiments, the solution diameter may have a range of from about 10 nm (nanometers) to about 100 μm (micrometers), meaning the capsules have a $D_1$ of about 10 nm and a $D_{99}$ of about 100 μm. In some embodiments, the solution diameter may have a range of from about 10 nm to 200 nm. In other embodiments, the solution diameter may have a range of from about 10 μm to 100 μm.

The embodiment capsule has a density in a range of from about 0.9 to about 1.2 g/mL.

Dispersion of Capsules in Super/Critical CO2

Figure 4:
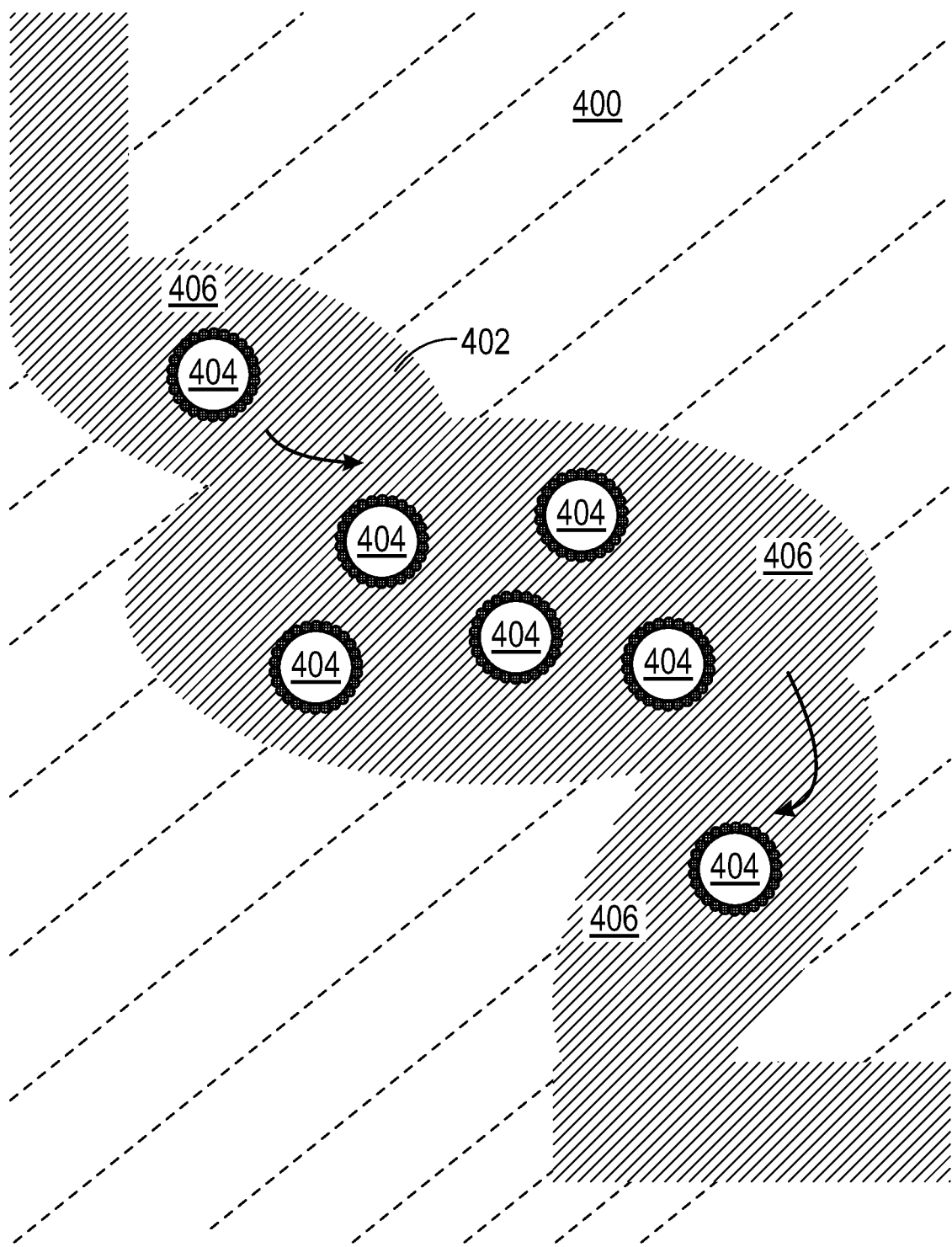
FIG. 4 is a simplified schematic of an embodiment dispersion in use in a hydrocarbon-bearing formation.

In another aspect, embodiments disclosed relate to a dispersion of the embodiment capsule previously described. FIG. 4 shows a simplified schematic of an embodiment dispersion in use in a hydrocarbon-bearing formation. A hydrocarbon-bearing formation 400 has pores 406 throughout. An embodiment dispersion within pores 406 may include $CO_2$ in the critical or supercritical state (referred to here as "SCCO2") 402 and capsules 404 dispersed within. Arrows (not labeled) show the direction of flow of the embodiment dispersion through the hydrocarbon-bearing formation.

In one or more embodiments of the dispersion, a medium of carbon dioxide that is at the critical/supercritical suspends the prior-described embodiment capsules. The critical temperature for carbon dioxide is approximately 31.1° C.; the critical pressure is approximately 8.38 MPa (megapascals). In some embodiments of the dispersion, the carbon dioxide is in a critical state. In some other embodiments of the dispersion, the carbon dioxide is in a supercritical state. An embodiment dispersion may include $CO_2$ in a temperature range of from about 50 to 100° C. An embodiment dispersion may include $CO_2$ in a pressure range of from about 1500 to 5000 psi (pounds per square inch).

In one or more embodiments of the dispersion, the carbon dioxide medium may have a purity of greater than 90%. The purity of the carbon dioxide is determined before introduction of the capsules into the embodiment dispersion, the introduction of water into the carbon dioxide, or the introduction of the carbon dioxide into a subterranean formation, as any contact may introduce external impurities into the SCCO2 medium. In some embodiments of the dispersion, the SCCO2 medium may have a density of from about 0.8 to 0.9 g/mL.

The embodiment dispersion also includes a capsule as previously described. In the embodiment shown in FIG. 4, the capsules 404 include hydrophobic COFs, as previously described. The embodiment capsule is stable in the formation environment. The COF particle and aqueous solution do not physically or chemically degrade or disassociate due to the presence of the SCCO2 medium.

One or more embodiments of the dispersion may include a percent volume of water as compared to the total volume of water and SCCO2. One or more embodiments of the dispersion may include from about 60 to 70 vol. % of water. A greater water content contributes to an increased density of the embodiment dispersion, as water has a greater density than SCCO2 under formation conditions. Additionally, the water may include additives such as, but not limited to, salts, clays, and other components found in the prior described different water types. Such additives may also contribute to embodiment dispersions having a greater density than SCCO2.

One or more embodiments of the dispersion may include any suitable amount of hydrophobic COF particles. In some embodiments, dispersions may include up to 5.0 wt. % of hydrophobic COF particles in terms of the total weight of the dispersion. Embodiment dispersions may have a lower limit of about 1.0, 1.5, 2.0, or 2.5 wt. % hydrophobic COF particles, and an upper limit of about 5.0, 4.5, 4.0, 3.5, or 3.0 wt. % hydrophobic COF particles, where any lower limit may be used in combination with any mathematically compatible upper limit.

One or more embodiments of the dispersion may have a bulk density suitable for mitigating gravity override. Such dispersions may have a bulk density of from about 0.9 to 1.1 g/mL at formation conditions. One or more embodiments of the dispersion may include from about 50 to 70 vol. % of embodiment capsules.

Dispersion of Complex Capsules in Super/Critical CO2

Figure 5:
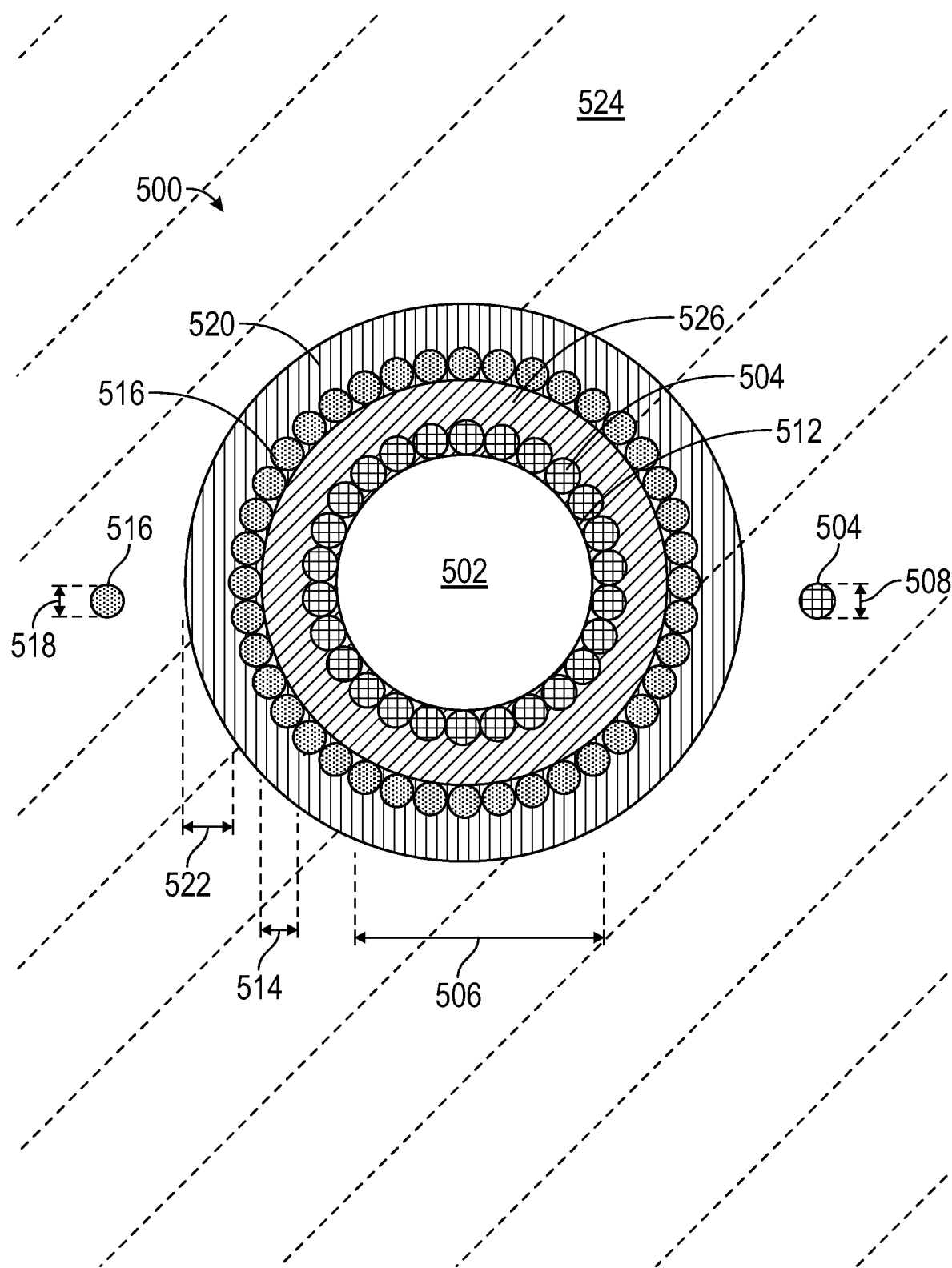
FIG. 5 is a simplified schematic of an embodiment complex capsule useful for treating hydrocarbon-bearing formations.

In another aspect, embodiments disclosed relate to a dispersion of complex capsules. FIG. 5 shows a complex capsule 500. A complex capsule includes, in part, a capsule as previously described, such as capsule 100. Specifically, FIG. 5 shows a complex capsule 500 having an aqueous solution 502 that is encapsulated by hydrophobic COF particles 504. The aqueous solution 502 as given in complex capsule 500 has a solution diameter 506. The hydrophobic COF particles 504 have a hydrophobic COF particle diameter 508. In the embodiment shown in FIG. 5, the surface 512 of the aqueous solution 502 is surrounded by a layer of hydrophobic COF particles 504 that forms an encapsulating shell around the aqueous solution 502 such that it is encapsulated. The aqueous solution 502 encapsulated by hydrophobic COF particles 504 is further surrounded by a SCCO2 medium layer 526. The SCCO2 medium layer has a layer thickness 514. In the embodiment shown in FIG. 5, the SCCO2 medium layer 526 is as well surrounded by a layer of hydrophilic COF particles 516 that forms a second encapsulating shell positioned around the SCCO2 medium layer 526. The hydrophilic COF particles 516 have a hydrophilic COF particle diameter 518. In the embodiment shown in FIG. 5, the hydrophilic COF particles are surrounded by a layer of water 520. The layer of water has a thickness 522. Finally, the double-encapsulated particle is dispersed in a medium of SCCO2 524. There are no particles—either hydrophilic or hydrophobic—at the third water/SCCO2 interface.

The SCCO2 medium layer may be any suitable thickness. In some embodiments of the complex capsule, the SCCO2 medium layer 526 is from about 10 nm (nanometers) to 50 nm in thickness.

Hydrophilic COFs may be similar in structure to the previously described hydrophobic COFs; however, they may include polar surface functionality to provide appropriate hydrophilicity, as previously described. Embodiment dispersions may include any suitable amount of hydrophilic COF particles. In some embodiments, dispersions may include up to 5.0 wt. % of hydrophilic COF particles in terms of the total weight of the dispersion. Embodiment dispersions may have a lower limit of about 1.0, 1.5, 2.0, or 2.5 wt. % hydrophilic COF particles, and an upper limit of about 5.0, 4.5, 4.0, 3.5, or 3.0 wt. % hydrophilic COF particles, where any lower limit may be used in combination with any mathematically compatible upper limit.

The layer of water 520 that surrounds the hydrophilic COFs 516 may be any suitable thickness. In some embodiments, the water layer 520 is from about 10 nm (nanometers) to 50 nm in thickness. Embodiment dispersions including complex capsules may include a suitable amount of additional water, as compared to the previously described dispersion including capsules, in order to form the layer of water 520. The amount of additional water is measured as a percentage relative to the amount of water that is included in the previously described dispersion including capsules. The amount of water included in the previously described dispersion including capsules is referred to as "the first amount of water," and the amount of additional water added to form a dispersion including complex capsules is referred to as "the second amount of water." In one or more embodiments, the second amount of water included in the dispersions including complex capsules may be from 40% to 100% of the first amount of water.

In one or more embodiments of the complex capsule, the capsule may have any suitable diameter. In some embodiments, complex capsule has a diameter in a range of from about 50 to 200 nm.

Figure 6:
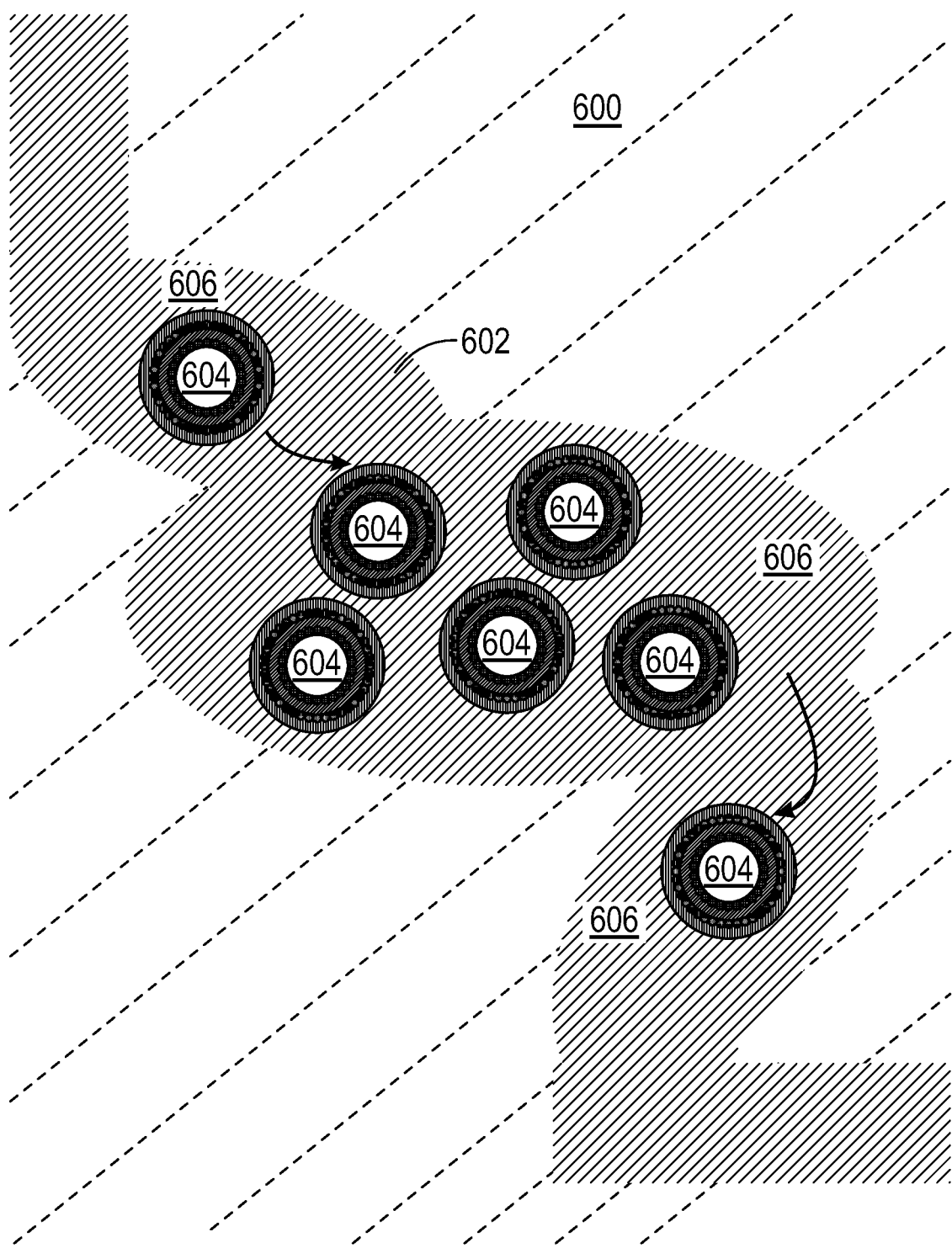
FIG. 6 is a simplified schematic of an embodiment complex dispersion in use in a hydrocarbon-bearing formation.

FIG. 6 shows a simplified schematic of an embodiment dispersion having embodiment complex capsules in use in a hydrocarbon-bearing formation. A hydrocarbon-bearing formation 600 has pores 606 throughout. An embodiment dispersion within pores 606 may include SCCO2 602 and capsules 604. Arrows (not labeled) show the direction of flow of the embodiment dispersion through the hydrocarbon-bearing formation.

In one or more embodiments, the complex dispersion may have a greater density than the previously described embodiment dispersions. An embodiment complex capsule may have a density of from about 0.9 to 1.2 g/mL. An embodiment complex dispersion may have a density of from about 0.9 to 1.1 g/mL.

Method of Forming a Dispersion

Figure 7:
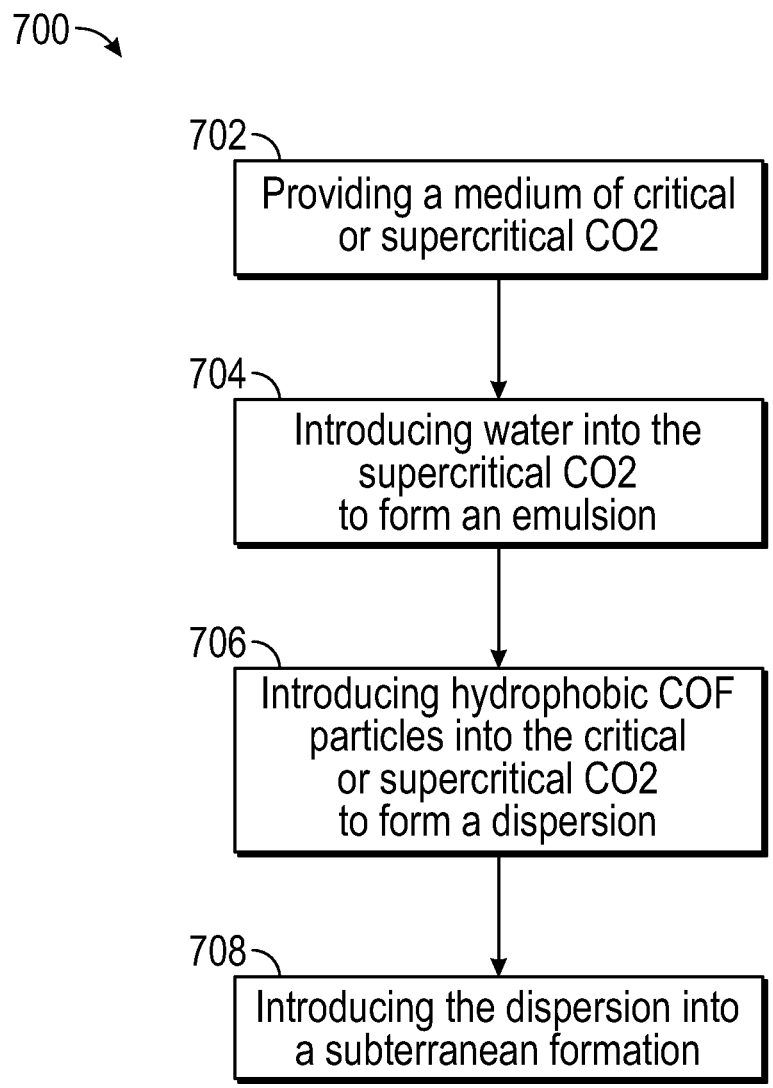
FIG. 7 is a block flow diagram of an embodiment method of making a dispersion.

In another aspect, embodiments disclosed relate to a method of making the previously described dispersion. FIG. 7 is a block flow diagram of an embodiment method of making a dispersion 700.

The method 700 may include providing a medium of carbon dioxide in the critical or supercritical state ("SCCO2") 702. In some embodiments, providing the medium may include introducing critical or supercritical carbon dioxide into a subterranean formation. In such cases, the dispersion may be produced in situ, that is, within the formation to be treated with the dispersion. As such, the treatment of the formation and the creation of the dispersion occur virtually simultaneously. In other embodiments, the dispersion is fabricated outside of a subterranean formation, such as on the surface or in a production facility.

The method 700 may include introducing water into the critical or supercritical carbon dioxide such that an emulsion of water in $CO_2$ forms 704. The carbon dioxide may be in a temperature in a range of from about 50 to 100° C. and a pressure range of from about 1500 to 5000 psi when water is introduced. The water may be introduced to SCCO2 by any suitable means in which the previously described temperatures and pressures may be maintained. For example, the water may be introduced by a pump configured to introduce fluids at a temperature and pressure greater than the temperature and pressure of the SCCO2, such by using a high pressure syringe pump. The water/SCCO2 mixture may then be mixed using vigorous stirring to form an emulsion. If COF particles are already present in the $CO_2$ as a dispersion, then the COF particles encapsulate the aqueous solution and the dispersion forms.

Upon introducing an aqueous solution into a SCCO2 medium, an emulsion of water droplets in SCCO2 may be formed. However, such emulsions may not be stable for extended periods because water and SCCO2 naturally separate due to differences in polarity of the two fluids.

The method 700 may include introducing hydrophobic COF particles into the critical or supercritical carbon dioxide 706. The hydrophobic COF particles may be suspended in an appropriate diluent for the addition, such as supercritical carbon dioxide. The SCCO2 in one or more embodiments of the dispersion may be in a temperature in a range of from about 50 to 100° C. and a pressure in a range of from about 1500 to 5000 psi when hydrophobic COF particles are added. Hydrophobic COF particles may be added to the SCCO2 under vigorous stirring to evenly disperse the hydrophobic COF particles. The dispersion may then be stirred for a period in a range of from about 30 to 60 minutes. If water is present in the SCCO2 medium and an emulsion is already present, the embodiment dispersion may immediately form. The hydrophobic COF particles described previously may be provided to the emulsion to encapsulate the aqueous solution present. Upon encapsulated, the polarity difference is mitigated, resulting in stabilizing the aqueous solution in the SCCO2 medium and forming the embodiment dispersion. If the aqueous solution is not present in the SCCO2, then a dispersion of hydrophobic COF particles in the critical or supercritical $CO_2$ is formed. In some embodiments, the water and hydrophobic COF particles may be introduced to the SCCO2 medium simultaneously.

When introduced into an aqueous-solution-in-SCCO2 emulsion, the hydrophobic particles, such as the previously-described COF particles, may collect at the interface between the aqueous solution and the SCCO2 if water is already present in the SCCO2 medium. If water is not present, the COF particles will likely be distributed approximately evenly throughout the SCCO2 medium until water is present. When the aqueous solution is introduced, however, the COF particles will tend to aggregate on the surface of the aqueous solution even though they are hydrophobic. As the hydrophobic COF particles collect at the aqueous/SCCO2 interface, a layer of hydrophobic COF particles forms as shown in FIG. 1. This hydrophobic COF layer serves to encapsulate the aqueous solution.

Due to the hydrophobic nature of the embodiments of the COF particles, Van der Walls forces between the $CO_2$ molecules in the SCCO2 medium and surfaces of the COF particles may be strong. This may have the effect of $CO_2$ molecules adsorbing onto the surfaces of the COF particles. Although not wanting to be bound by theory, it is believed that $CO_2$ molecules may pack more tightly near the surface of a capsule with COF particles as compared to molecules in the bulk SCCO2 medium. This may result in an increase in the bulk density of SCCO2/capsule dispersion. As previously described, COF particles may have a significant BET surface area. A significant BET surface area may allow for additional surface sites for SCCO2 adsorption, thus increasing the density of embodiment dispersions versus other non-COF particles.

Method for Forming a Complex Dispersion

In another aspect, embodiments disclosed relate to a method of making the previously described complex dispersion. The method includes first forming the previously described dispersion including aqueous capsules in SCCO2. This dispersion is referred to here as "the first dispersion." Once the first dispersion is formed, hydrophilic COF particles and water are added to the first dispersion under vigorous stirring to form a second dispersion. The second dispersion is stirred for a period in a range of from about 30 to 60 minutes. Once the additional water and hydrophilic COFs have been added, and a sufficient period of mixing occurs, an embodiment complex dispersion forms.

Method of Use in a Hydrocarbon-Bearing Formation

In another aspect, embodiments disclosed relate to a method of using the previously described embodiment dispersions in a hydrocarbon-bearing formation. As shown in FIG. 4, the embodiment dispersion comprising the embodiment capsules are shown traversing the pore structure of a reservoir. As shown in FIG. 6, an embodiment dispersion comprising the embodiment complex capsules are shown traversing the pore structure of a reservoir. Embodiment capsules and complex capsules may be utilized in dispersions in similar manners in a hydrocarbon-bearing formation.

As shown in FIG. 7, an embodiment method may include introducing the previously described embodiment dispersion that comprises the embodiment capsules in critical or supercritical carbon dioxide into a subterranean formation, such as a hydrocarbon-bearing formation 708. Embodiment methods may include introducing a previously formed embodiment dispersion having the previously described embodiment capsules into a subterranean formation. In other embodiments, components of the dispersion may be introduced separately, meaning that the SCCO2 medium, aqueous solution and COF particles may each be introduced separately into the formation, and embodiment dispersions may be formed in the subterranean formation in situ.

In one or more embodiments, the SCCO2 medium and COF particles are introduced into a subterranean formation prior to the water. In some embodiments, the COF particles are dispersed in the SCCO2 medium prior to introduction into the subterranean formation. If forming a complex dispersion including the previously described complex capsules, additional water and hydrophilic COF particles may be introduced after the initial SCCO2, hydrophobic COFs and water are introduced into the subterranean formation.

Figure 8:
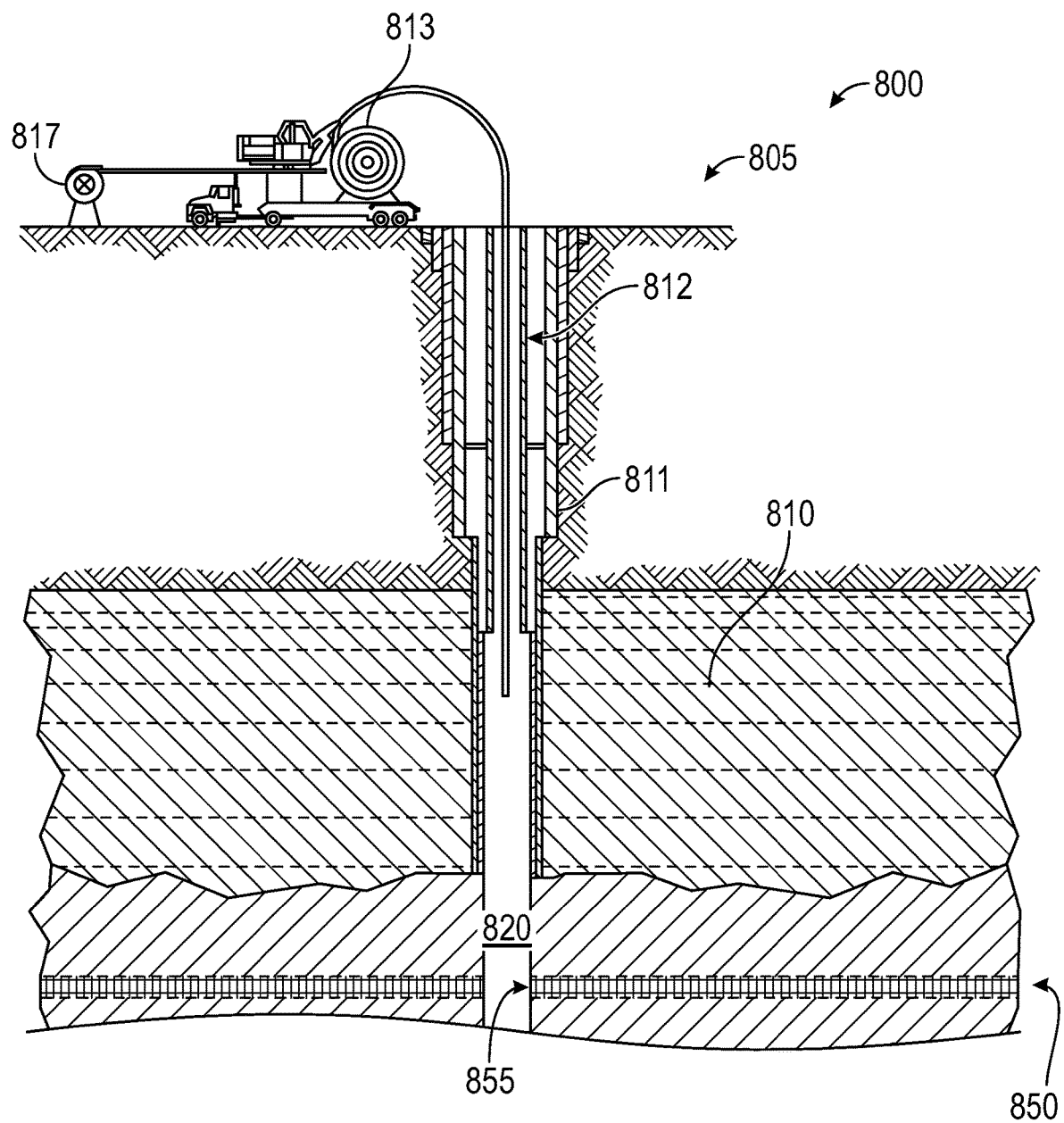
FIG. 8 is a simplified schematic of a hydrocarbon bearing formation in accordance with one or more embodiments of the present disclosure.

FIG. 8 is a diagram that illustrates a well environment 800 in accordance with one or more embodiments. Well environment 800 includes a subsurface 810. Subsurface 810 is depicted having a wellbore wall 811 both extending downhole from a surface 805 into the subsurface 810 and defining a wellbore 820. The subsurface 810 also includes target formation 850 to be treated. Target formation 850 has target formation face 855 that fluidly couples target formation 850 with wellbore 820 through wellbore wall 811. In this case, casing 812 and coiled tubing 813 extend downhole through the wellbore 820 into the subsurface 810 and towards target formation 850.

With the configuration in FIG. 8, the previously-described embodiment dispersion that comprises the embodiment capsules in the SCCO2 medium may be introduced into the subsurface 810 and towards target formation 850 via a pump 817 through the coiled tubing 813. In another embodiment, as previously described, the dispersion may be formed in situ, meaning components of the dispersion ($CO_2$, aqueous solution, COF particles) may be introduced into the subsurface 810 separately via the pump 817 through the coiled tubing 813, forming the dispersion inside the target formation 850. In such embodiments, multiple pumps may be used to separately inject components of the dispersion.

Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Hydrocarbon-bearing formations may include formations with pores sizes of from about 100 nm to 100 µm. As such, embodiment capsules have sizes in an appropriate range to traverse pores of hydrocarbon-bearing formations. Embodiment dispersions may be appropriate for use in different types of subterranean formations, such as carbonate, shale, sandstone, and tar sands.

Embodiments of the present disclosure may provide at least one of the following advantages. As described previously, one or more embodiments of the dispersion may have greater density than bulk supercritical $CO_2$. As such, the embodiment dispersion may not have the gravity override challenges traditionally associated with SCCO2 in enhanced oil recovery applications. The embodiment SCCO2 dispersion may traverse deeper into target formations to treat portions of the formation that have not been treated or that have been bypassed. The capsules may remain stable and operable in the formation for meters, 10 s of meters, 100 s of meters, and kilometers from their point of introduction, facilitating repeated transport of densified carbon dioxide into under-treated and non-treated areas of the treated formation. The compositions and methods disclosed here may result in in greater oil recovery and increased oil production.

When the word "approximately" or "about" are used, this term may mean that there can be a variance in value of up to ±10%, of up to 5%, of up to 2%, of up to 1%, of up to 0.5%, of up to 0.1%, or up to 0.01%.

Although only a few example embodiments have been described in detail, those skilled in the art will readily appreciate that many modifications are possible in the example embodiments without materially departing from the disclosed scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims, except for those in which the claim expressly uses the words 'means for' together with an associated function.

What is claimed is:

1. A composition of matter comprising:
   a dispersion of capsules in critical or supercritical carbon dioxide, the capsules comprising an aqueous solution encapsulated by covalent organic framework particles, wherein the covalent organic framework particles comprise a crystalline porous polymer comprising a heteroatom selected from the group consisting of nitrogen, boron, oxygen, and combinations thereof, and wherein a BET surface area of the covalent organic framework particles is in a range of from about 700 to about 3700 $m^2/g$.

2. The composition of claim 1, where the capsules have an aqueous solution diameter in a range of from about 10 nm to 100 µm.

3. The composition of claim 1, where the covalent organic framework particles are hydrophobic.

4. The composition of claim 1, where the capsules have a diameter in a range of from about 10 nm to 100 µm.

5. The composition of claim 1, where the dispersion comprises in a range of from about 60 to 70 vol. % of the aqueous solution.

6. The composition of claim 1, where the dispersion comprises up to 5.0 wt. % of the covalent organic framework particles.

7. The composition of claim 1, where the dispersion has a bulk density in a range of from about 0.9 to 1.1 g/mL.

8. A method of making a dispersion of aqueous solution capsules, the method comprising:
   providing a medium of critical or supercritical carbon dioxide;
   introducing the aqueous solution into the critical or supercritical carbon dioxide medium; and
   introducing a covalent organic framework particle into the critical or supercritical carbon dioxide medium,
   wherein the covalent organic framework particle comprises a crystalline porous polymer comprising a heteroatom selected from the group consisting of nitrogen, boron, oxygen, and combinations thereof, and wherein a BET surface area of the covalent organic framework particles is in a range of from about 700 to about 3700 $m^2/g$.

9. The method of claim 8, where the aqueous solution is introduced into the critical or supercritical carbon dioxide medium via a pump configured to introduce fluids at a temperature and pressure greater than a temperature of the critical or supercritical carbon dioxide medium and a pressure greater than a pressure of the critical or supercritical carbon dioxide medium.

10. The method of claim 8, where the aqueous solution and the covalent organic framework particle are introduced into the critical or supercritical carbon dioxide medium simultaneously.

11. The method of claim 8, where the aqueous solution is introduced into the critical or supercritical carbon dioxide medium prior to the covalent organic framework particle being into the critical or supercritical carbon dioxide medium.

12. The method of claim 8, where the covalent organic framework particle is introduced into the critical or supercritical carbon dioxide medium prior to the aqueous solution being introduced into the critical or supercritical carbon dioxide medium.

13. The method of claim 8, where the dispersion has a bulk density in a range of from about 0.9 to 1.1 g/mL.

14. A method comprising:
introducing into a hydrocarbon-bearing formation a dispersion of aqueous solution capsules in a medium of critical or supercritical carbon dioxide, the capsules comprising an aqueous solution encapsulated by covalent organic framework particles,
wherein the covalent organic framework particles comprise a crystalline porous polymer comprising a heteroatom selected from the group consisting of nitrogen, boron, oxygen, and combinations thereof, and wherein a BET surface area of the covalent organic framework particles is in a range of from about 700 to about 3700 $m^2/g$.

15. The method of claim 14, where the covalent organic framework particles are hydrophobic.

16. The method of claim 14, where the dispersion comprises in a range of from about 60 to 70 vol. % of the aqueous solution.

17. The method of claim 14, where the dispersion comprises up to 5.0 wt. % of the covalent organic framework particles.

\* \* \* \* \*